United States Patent
Feldmeier et al.

(10) Patent No.: US 7,220,956 B2
(45) Date of Patent: May 22, 2007

(54) OPTICAL MOUSE WITH REDUCED POWER CONSUMPTION

(75) Inventors: David Charles Feldmeier, San Jose, CA (US); Tong Xie, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 133 days.

(21) Appl. No.: 10/918,504

(22) Filed: Aug. 13, 2004

(65) Prior Publication Data

US 2006/0033015 A1    Feb. 16, 2006

(51) Int. Cl.
*G09G 5/08* (2006.01)
(52) U.S. Cl. .................................. 250/221; 345/163
(58) Field of Classification Search ........... 250/221, 250/222.1; 345/156–167, 173, 175
See application file for complete search history.

(56) References Cited

U.S. PATENT DOCUMENTS

| | | | | |
|---|---|---|---|---|
| 5,528,022 | A | * | 6/1996 | Nakazawa .................. 235/436 |
| 2004/0130532 | A1 | * | 7/2004 | Gordon et al. ............. 345/166 |
| 2005/0001142 | A1 | * | 1/2005 | Lauffenburger et al. .... 250/205 |
| 2005/0024336 | A1 | * | 2/2005 | Xie et al. ................... 345/166 |

* cited by examiner

*Primary Examiner*—Stephone B. Allen

(57) ABSTRACT

Power savings occur when the optical path of an optical navigation device is configured to provide that maximum energy from the light source is reflected by the navigation surface to the photosensors of the optical navigation chip. Additional power savings may be achieved when the maximized optical path is combined with the features of a controlled light source that uses specular reflection.

11 Claims, 5 Drawing Sheets

OPTICAL MOUSE WITH REDUCED POWER CONSUMPTION

BACKGROUND

Wireless navigation devices, e.g. optical mice, are becoming increasingly popular. A wireless optical mouse requires an internal power source because it is not connected to an external source of power. A wireless optical mouse typically includes an internal power source that supplies power to an optical navigation chip, a light source, a microcontroller and a transmitter. The most common internal power source is a battery, either rechargeable or disposable. The battery life is determined by the total power consumed during mouse operation. Increased battery life is an important goal, as the battery life of contemporary wireless optical mice is considered inadequate.

The light source in a conventional optical mouse accounts for approximately one quarter of the total power consumption of the mouse. The power required for the light source depends on the behavior of the photosensors of the optical navigation chip surface. To operate correctly, the photosensors of an optical navigation chip must receive a certain amount of light during the time that the photosensors are active. The photosensors will not provide useful information if either too little light is received (no signal) or too much light is received (saturation). Two basic approaches are used to assure that photosensors received a controlled amount of light while they are active. The first approach is to use a constant light source and to switch the photosensors from an active state to an inactive state when enough light is estimated to have been received during each sample period. The second approach, controlled light source technique, is to change the duty cycle and/or intensity of the light source to adjust the amount of light received by the photosensors during each sample period. If power savings is a concern, then the second approach is superior, because the light source is illuminated only during the periods that the photosensors require illumination.

When using the controlled light source method described above, power usage is minimized when the fraction of light reaching the photosensor array is maximized. For conventional optical mice, the navigation surface below the mouse is assumed to cause the light source to be scattered uniformly from the surface. For such a surface, light received by the photosensors is maximized when the photosensor array is parallel to the navigation surface and is centered over the illuminated portion of the navigation surface. As the photosensor array is moved away from being directly centered above the illuminated area of the navigation surface, the fraction of light received by the photosensor array is expected to decrease. However, most surfaces do not cause uniform scattering and many have a stronger component in the specular direction.

SUMMARY

The present invention uses a controlled light source with a new optical path design that maximizes the light received by the photosensor array on the vast majority of navigation surfaces that do not perform uniform scattering. Power savings occur when the optical path of the mouse is configured to provide that maximum energy from the light source is reflected by the navigation surface to the photosensors of the optical navigation chip. The controlled light source and optimized optical path optionally are combined with a mechanism to reduce average frame rate.

DETAILED DESCRIPTION

Figure 1:
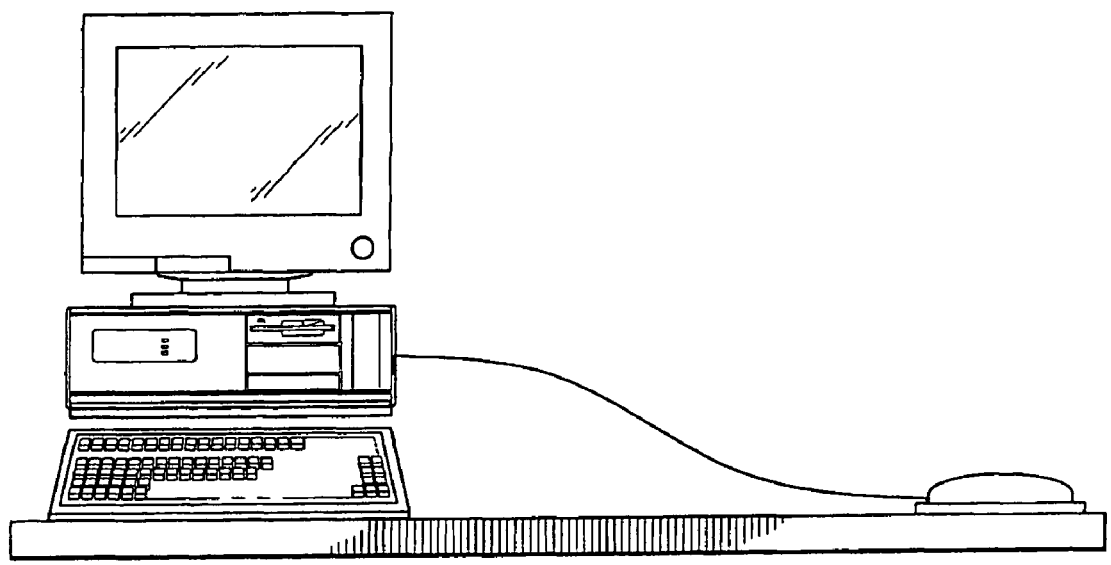
FIG. 1 illustrates a prior corded optical mouse.

FIG. 1 shows a prior art corded optical mouse that is connected to a computer to provide a means of moving the cursor on the computer display.

Optical navigation chips used in optical mice automatically adjust the power emitted by the light source to maintain an acceptable light level for the photosensor array of the optical navigation chip. The power required by the light source depends on how much of the light is reflected from the navigation surface to the photosensor array of the optical navigation chip. The goal is to maximize the light received by the photosensor array for a fixed amount of power emitted from the light source.

Figure 2:
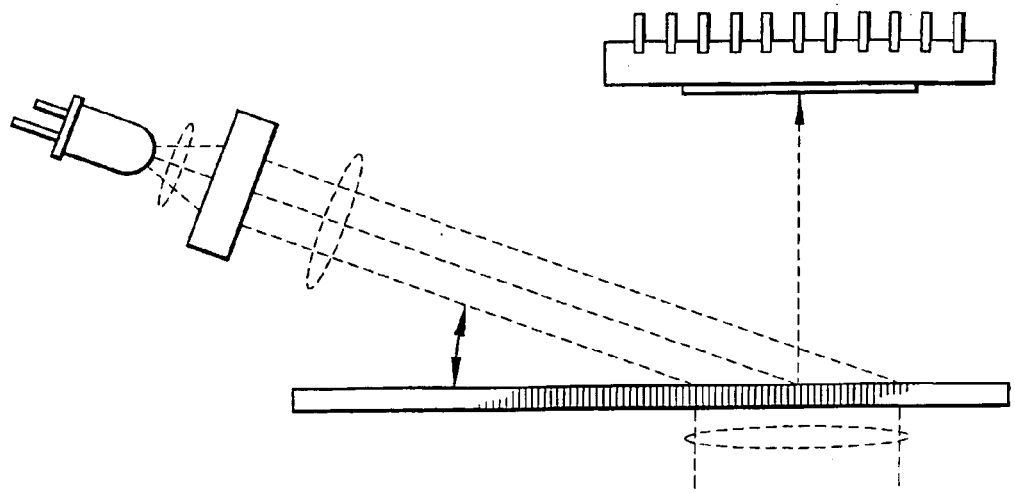
FIG. 2 illustrates the optical path in the prior art optical mouse shown in FIG. 1.

The prior art optical mouse illuminates a surface with a light source and has an optical navigation chip that expects a uniform scattering from the navigation surface, as shown in FIG. 2. For such a surface, light received by the photosensors is maximized when the photosensor array is parallel to the navigation surface and is centered over the illuminated portion of the navigation surface.

Figure 3:
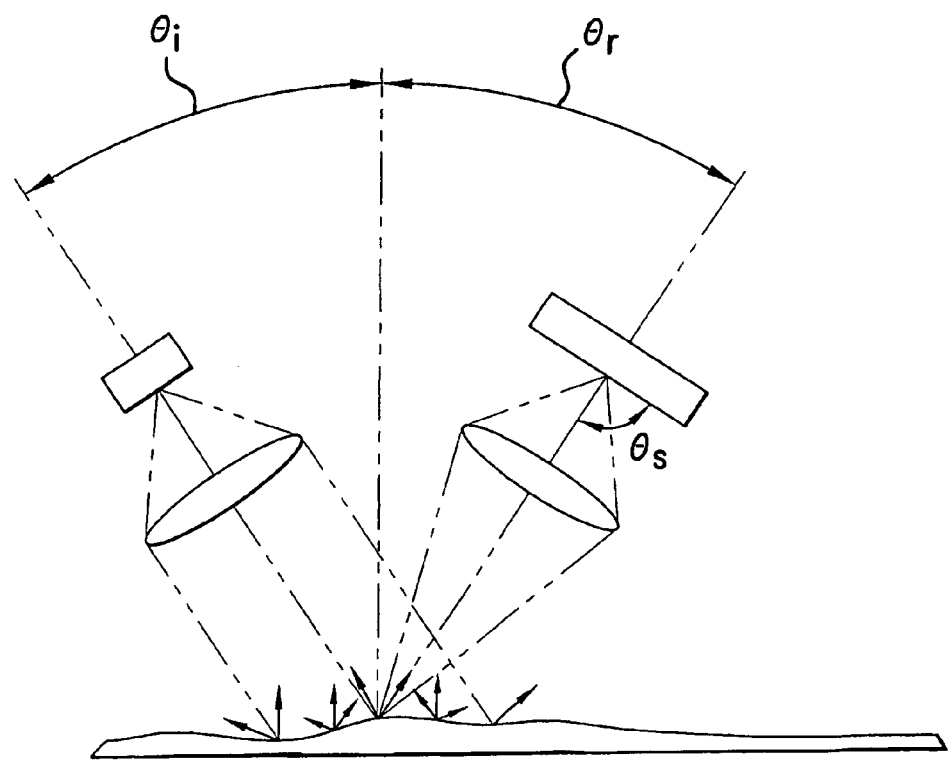
FIG. 3 shows an embodiment of the optical path according to the present invention.

FIG. 3 illustrates an optical path according to the present invention. Since most common surfaces have a strong element of direct reflectivity, the photosensor array receives a relatively larger amount of light when the photosensor array is placed in line with this reflection. The technique works regardless of the nature of the light source (e.g., coherent or incoherent). The amount of power from the light source necessary for optical navigation is reduced as the reflectivity of the navigation surface increases. When the scattering from a surface is entirely uniform, the improved mouse uses more power for illumination than would be used by an optical mouse with a conventional optical path design. However, since few surfaces scatter uniformly, the power required for the light source is reduced in most cases.

The light source and the photosensor array are positioned approximately symmetrically about a vertical axis extending from the centroid of the illumination area of the surface. Equation 1 describes the position of the sensor angle $\theta_s$ with respect to the angle of reflection $\theta_r$.

$$\text{MAX}(\theta_r, 45°) \leq \theta_s \leq \text{MIN}(\theta_r + 90°, 135°) \qquad \text{Equation 1}$$

The power savings technique is of practical value because many surfaces on which an optical mouse might be used have some direct reflectivity that exceeds the amount of diffuse reflectivity, e.g. a polished wood desktop or a magazine cover.

Figure 4:
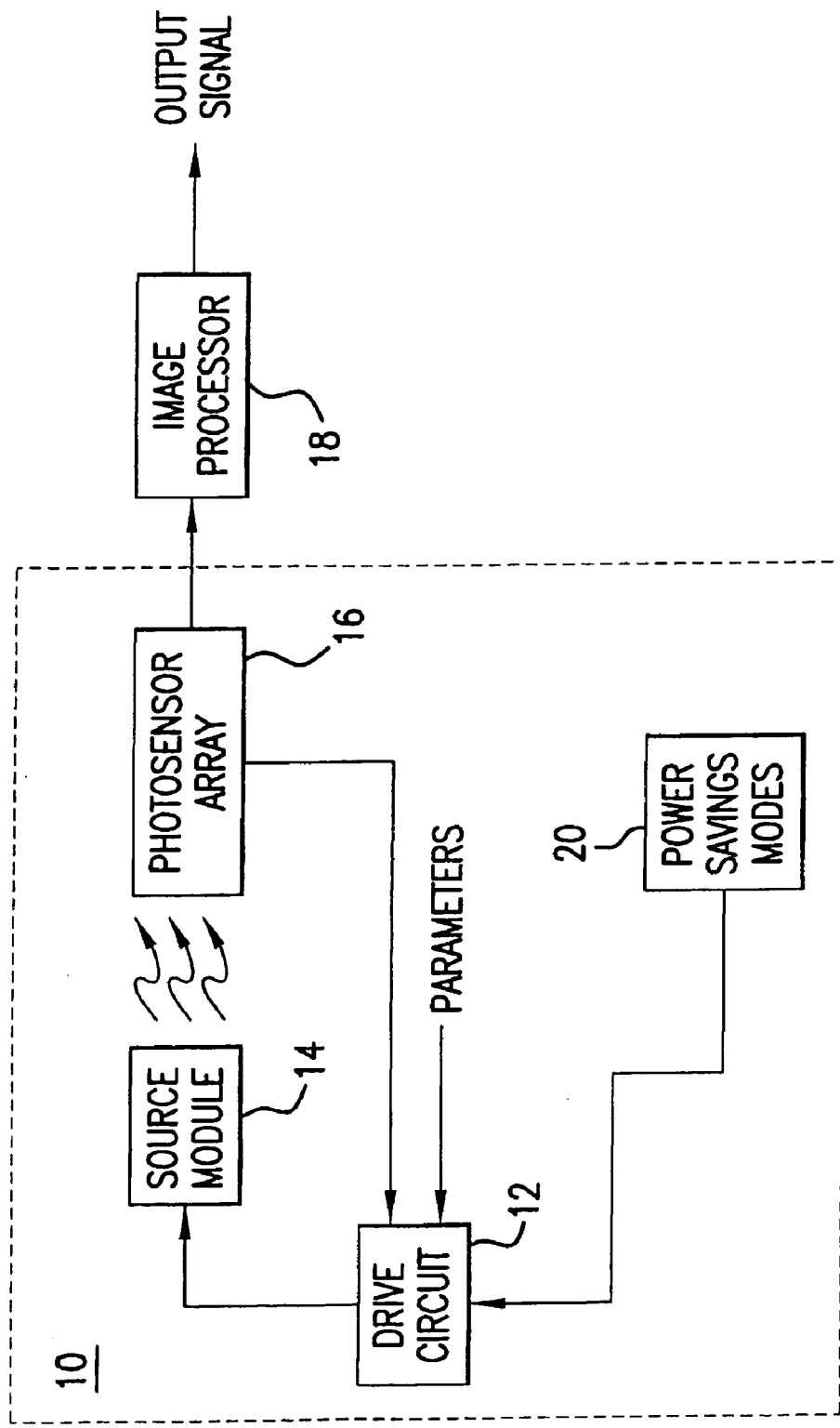
FIG. 4 discloses a functional block diagram for an optical mouse of the present invention.

FIG. 4 illustrates a functional block diagram of the optical navigation system 10 according to the present invention. A drive circuit 12 provides power to a source module 14, e.g. a laser diode or light emitting diode. The source module 14 emits light toward a surface (not shown). A photosensor array 16 receives light reflected from the surface. Each photosensor within the photosensor array 16 converts the light into a voltage that is based on the amount of light received. An image processor 18 receives the data for further processing. The drive circuit 12 compares the output of the photosensor array 16 to existing parameters to adjust the output of the light source for each frame based on the observed results from previous frames. Typically, the average photosensor illumination is selected to match a preset threshold.

The drive circuit 12 receives power savings mode data 20. A power savings mode 20 changes the amount of power used to drive the light source 14 by changing the number of frames per second that occur, e.g. changing the sampling rate for a given period, but it does not alter the power required per frame. The light source 14 duration is controlled based on the level of photosensor illumination observed in previous frames. The sampling rate is controlled by a parameter indicative of mouse behavior, e.g. current velocity, elapsed time between detected movements, etc.

In operation, the sampling rate is adjusted to assure that the change in position from frame-to-frame has some overlapping position data. Thus, the faster the mouse is moving, the higher the sampling rate that is required. However, maintaining the maximum sampling rate leads to excessive power usage. Thus, the sampling rate is adjusted to occur less frequently when the mouse moving slowly or not at all and faster when the mouse is moving rapidly. Controlling the variable sampling rate is described in more detail in "Apparatus for controlling a screen pointer with a frame rate based on velocity", U.S. Ser. No. 10/338,257, filed 7 Jan. 2003, assigned to Agilent Technologies. To illustrate, controlling the variable sampling rate may be determined by housing movement, elapsed time, or user presence. If housing movement is selected, the power savings mode is selected based on the output of a sensor for detecting velocity or acceleration. When controlling the sampling rate depends upon user input or elapsed time between user inputs, the power savings mode is selected based on the output of a mechanical switch, capacitance sensor, and infrared sensor.

Figure 5:
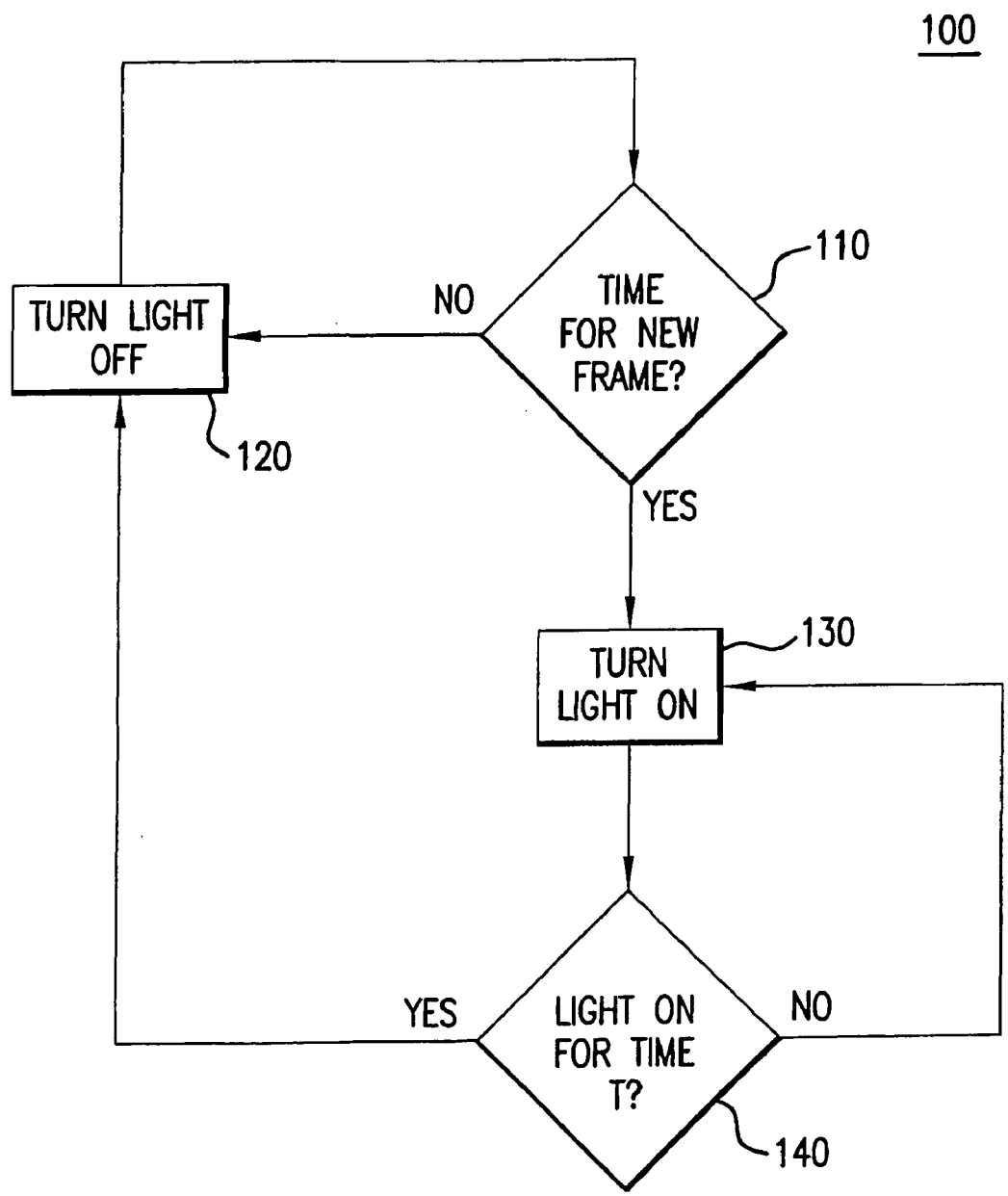
FIG. 5 discloses a process flow chart for the drive circuit shown in FIG. 4.

FIG. 5 discloses a process flow chart 100 for the drive module circuit according to the present invention. In step 110, the light source is off and it is determined whether it is time for a new frame of data. If no, in step 120, the source module remains turned off. If yes, in step 130, the source module is turned on. In step 140, it is determined whether the light has been on for a sufficient time. If no, return to step 120. If yes, go to step 130.

Figure 6:
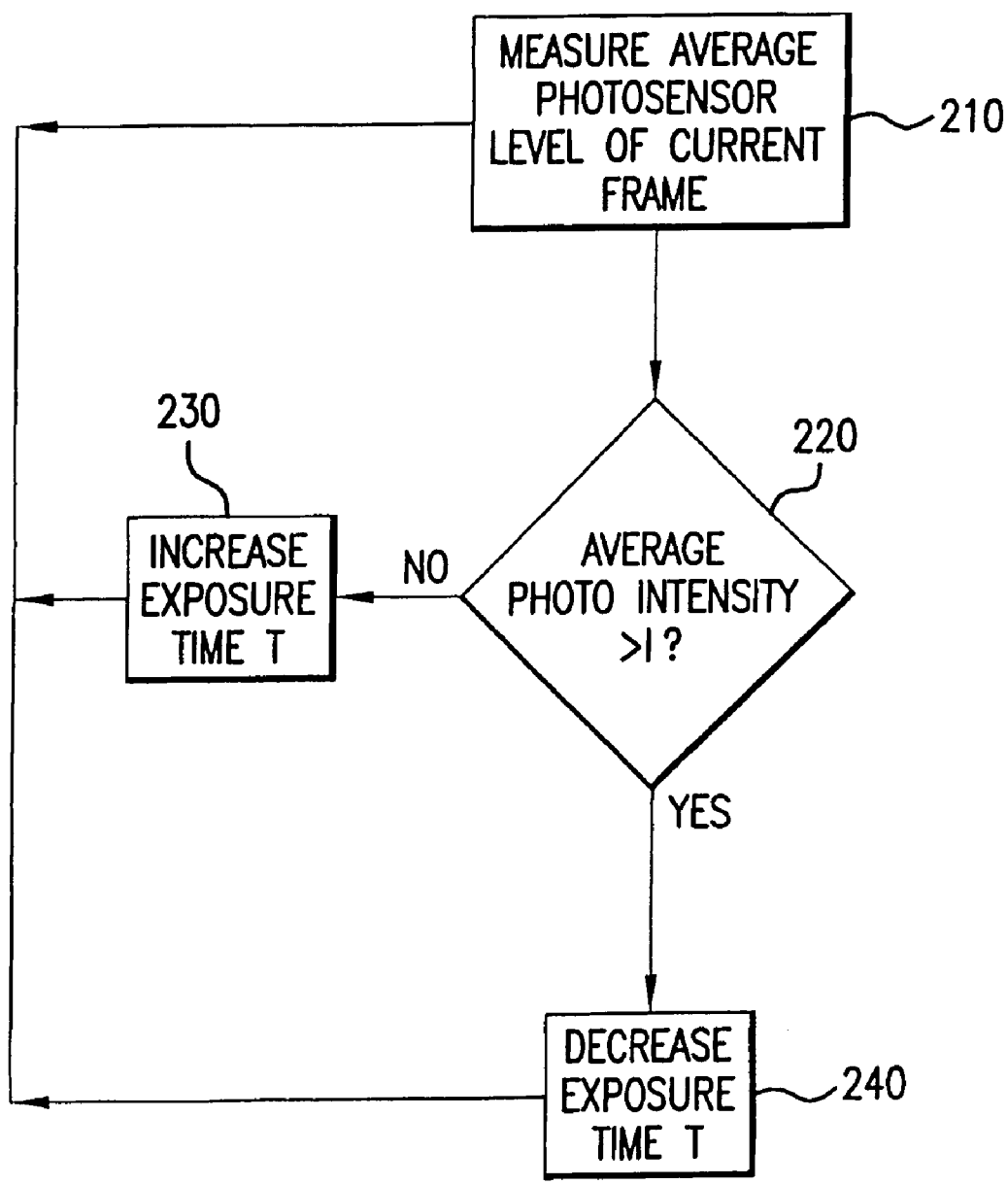
FIG. 6 discloses a functional block diagram for the drive circuit shown in FIG. 4.

FIG. 6 discloses a process flow chart 200 for adjusting the illumination interval for the source module according to the present invention. In step 210, the reflected power of a surface is measured. In step 220, it is determined if the average intensity is greater than a preset value. If no, in step 230, the exposure time is increased. If yes, in step 240, the exposure time is decreased. In an alternate embodiment, the results from several frames are averaged before changing the illumination interval.

While this invention has been described with respect to a wireless navigation device using a visible light source, the concept can be easily extended to all navigation devices that use electromagnetic radiation for positioning.

The invention claimed is:

1. A navigation system comprising:
   a source module generating electromagnetic radiation to produce an illumination area on a surface;
   a detector module, receiving one of reflected and scattered electromagnetic radiation from the surface, generating an output signal indicative of an amount of electromagnetic radiation received by the detector module from the surface; and
   a drive circuit, receiving the output signal, generating a drive signal for the source module;
   a housing, the source module, the detector module, and the drive circuit positioned therein;
   wherein the source module and the detector module are positioned approximately symmetrically about a vertical axis extending from the centroid of the illumination area of the surface.

2. A navigation system, as defined in claim 1, wherein the drive circuit provides the drive signal solely when illumination is needed by the detector module.

3. A navigation system, as defined in claim 1, wherein the source module is selected from a group that includes coherent light sources, incoherent light sources, and partially coherent light sources.

4. A navigation system, as defined in claim 1, further comprising:
   a power savings mode; and
   the drive circuit receiving a signal from the power savings mode and enabling the power savings mode.

5. A navigation system, as defined in claim 4, the power savings mode is a frame rate selector.

6. A navigation system, as defined in claim 5, wherein the frame rate selector generates an output signal based on a parameter selected from a group that includes housing movement, elapsed time, and user presence.

7. A navigation system, as defined in claim 6, wherein the parameter is housing movement, further including a sensor for detecting the velocity of the housing movement.

8. A navigation system, as defined in claim 6, wherein the parameter is housing movement, further including a sensor for detecting the acceleration of the housing movement.

9. A navigation system, as defined in claim 6, wherein the parameter is elapsed time, further including a sensor selected from a group comprising a mechanical switch, capacitance sensor, and infrared sensor.

10. A navigation system, as defined in claim 1, wherein the detector module is tilted toward the centroid of the illumination area of the surface.

11. A navigation system, as defined in claim 1, wherein the detector module is positioned such that a sensor angle $\theta_s$ with respect to an angle of reflection $\theta_r$ satisfies:

$$MAX(\theta_r, 45°) \leq \theta_s \leq MIN(\theta_r + 90°, 135°).$$

* * * * *